US011686464B2

(12) United States Patent
Kuzniar

(10) Patent No.: US 11,686,464 B2
(45) Date of Patent: Jun. 27, 2023

(54) HEAD HOUSING FOR CURING PIPELINE RESIN LINING

(71) Applicant: Piotr Kuzniar, Kochanowskiego (PL)

(72) Inventor: Piotr Kuzniar, Kochanowskiego (PL)

(*) Notice: Subject to any disclaimer, the term of this patent is extended or adjusted under 35 U.S.C. 154(b) by 65 days.

(21) Appl. No.: 17/346,985

(22) Filed: Jun. 14, 2021

(65) Prior Publication Data

US 2021/0388975 A1   Dec. 16, 2021

(30) Foreign Application Priority Data

Jun. 15, 2020 (EP) .................................... 20460028

(51) Int. Cl.
*F21V 29/60* (2015.01)
*B33Y 80/00* (2015.01)
*B29C 63/00* (2006.01)
*F21V 15/01* (2006.01)
*B29L 23/00* (2006.01)

(52) U.S. Cl.
CPC .......... *F21V 29/60* (2015.01); *B29C 63/0004* (2013.01); *B33Y 80/00* (2014.12); *F21V 15/01* (2013.01); *B29L 2023/22* (2013.01)

(58) Field of Classification Search
CPC .................................. F21V 29/60; B33Y 80/00
See application file for complete search history.

(56) References Cited

U.S. PATENT DOCUMENTS 4,785,216 A * 11/1988 Roberts ................... H01J 61/52
  313/32
7,524,089 B2   4/2009 Park
2020/0049301 A1 * 2/2020 Rasmussen ......... F16L 55/1654

FOREIGN PATENT DOCUMENTS

EP     3336404        6/2018
PL      231344        9/2019
WO   WO2018127583     7/2018

* cited by examiner

Primary Examiner — Nicholas R Krasnow
(74) Attorney, Agent, or Firm — Defillo & Associates, Inc.; Evelyn A. Defillo

(57) ABSTRACT

A head housing for curing of resin pipeline lining used in heads for curing inner pipeline resin linings with significantly increased heat dissipation efficiency, having at least one cooling passage (6), which length S is more than twice the length L of the longitudinal part (1) of this housing.

8 Claims, 6 Drawing Sheets

A-A

HEAD HOUSING FOR CURING PIPELINE RESIN LINING

FIELD OF THE INVENTION

The present inventions relates to a housing used in heads for curing inner pipeline resin linings with significantly increased heat dissipation efficiency.

BACKGROUND OF THE INVENTION

It is known from the US patent specification U.S. Pat. No. 7,524,089, a LED bulb having a cooling fan, forcing air circulation, placed in the main housing, having multiple radial walls formed on the external peripheral surface, acting as a heat sink for heat dissipation, on the other side of which a set of multiple LEDs emitting electromagnetic radiation is placed on the printed circuit board used for light control.

It is also known from the Polish patent specification PL231344B1, the design of a device for curing inner pipeline resin linings, which has two frontally located heat sinks of alternately varying lengths of their rectangular plates, including the first one at the compressed air inlet causing the air to flow between these plates/ribs/of this heat sink and receives the heat, and gives it off at the outlet of the second heat sink located coaxially with the first heat sink. In the event of a failure of the air compressor, cooling this front heatsink, its large heat capacity allows the operation of the unit without the cooling air supply to be extended until the copper core of the device heats up to its limit temperature. In an another embodiment of the device according to the present invention, the device has two housing parts having the shape of a round cylinder, assembled from six arched segments of each housing.

It is also known from the European patent application EP3336404A1, a device for curing inner pipeline linings made with the use of a resin compound cured by means of electromagnetic radiation, said device being equipped with a central polyhedral body provided with LEDs generating the radiation by emitting waves with lengths from the range 200-500 nm, to cause curing of said resin compound, where said LEDs are shielded with an element made of a transparent plastic or quartz glass is characterized with that its body constitute monolithic cylindrical solids having along the whole of length of their outside surfaces with defined radii identical flat facets-chords symmetrically distributed on said surfaces, to which detachably attached are plastic plates equipped with LEDs emitting electromagnetic radiation with definite range of wavelengths, whereas between each two chords situated next to each other, provided are slit grooves radially oriented and terminated with circular or semi-circular grooves with heights ranging from ⅔ to ¾ of lengths of radii of the bodies, and side walls of the identical figures separated this way from each other and with their shapes close to isosceles trapeziums are provided with profiled recesses with diversified lengths functioning as radiators, to which compressed air for cooling the LEDs is supplied via profiled recesses in brackets, whereas the air outlet is provided in analogous brackets, which are joined detachably with rear and front faces respectively, of the body of the device.

In turn, the application WO2018127583 A1 discloses an apparatus for curing a liner of a pipeline, said liner including a resin which is curable by exposure to electromagnetic radiation of a specific wavelength or a specific wavelength range, said apparatus comprising: a housing defining opposite first and second ends, an outer wall of a substantially cylindrical configuration, and an inner wall defining a substantially unobstructed through-going passage extending longitudinally through said housing between said first and second ends; a pair of power supply wires for the supply of electrical power to said apparatus and extending from said first end of said housing; a plurality of LED's irradiating electromagnetic radiation of said specific wavelength or said specific wavelength range, said plurality of LED's being positioned and substantially evenly distributed at said outer wall of said housing, said plurality of LED's being connected through an electronic circuit to said pair of power supply wires; said plurality of LED's being connected in thermal conductive relationship to heat dissipating elements freely exposed at said inner wall of said housing in said through-going passage of said housing for allowing a stream of cooling fluid to pass through said passage for dissipating heat from said heat dissipating elements and cooling said LED's characterized in that said housing defines an innermost wall dividing said substantially unobstructed through-going passage into an inner passage centrally located within said substantially unobstructed through-going passage and extending substantially between said first and second ends, and, an outer passage defined between said inner wall and said innermost wall and coaxially enclosing said inner passage. wherein said housing defines a centrally located inlet for receiving pressurized gas, said inlet being in fluid communication with said inner passage at said first end and wherein said housing is closed at said second end and said through-going passage defines a flow reversing chamber at said second end for establishing fluid communication between said first passage and said second passage.

During the operation of the known and previously used heads, the main problem to be solved is to ensure sufficient cooling/dissipation of heat from its subassemblies, generated by the operation of the LEDs located on the external part of the housing and connected to it, used for the emission of electromagnetic radiation of an appropriately selected wavelength—enabling hardening of the resin lining placed inside a pipeline, inside which the head is located. Increasing the efficiency of heat dissipation allows to increase the life of mainly the LEDs located there and other heated components.

Known and used so far methods of cooling housings have consisted mainly in developing newer and more complex shapes of housings with through-going, longitudinal passages with multiple heatsink branches increasing the area from which heat is transferred to the environment (for example, disclosed in EP3336404A1 or WO2018127583A1), or having a simple design, and the LEDs positioned on them lit up cyclically, thanks to which the cooling time between the cycles of these LEDs was obtained, as well as using additional elements in the form of fans (U.S. Pat. No. 7,524,089) or movable housings, which assisted cooling through forced air circulation and also using additional air flow reversing chambers (WO2018127583A1). Unfortunately, the use of complex shapes of the through-going passages of a housing does not allow the maximum use of the cooling air stream due to its heterogeneous flow along the entire length of a passage, as it flows differently in places where the passage is wider than in places where it is narrower. Additionally, the complex design of passages makes the air streams with different velocities to collide, resulting in flow turbulence, which additionally reduces the efficiency of the air stream flow and thus also its cooling efficiency.

SUMMARY OF THE INVENTION

The aim of this solution is to develop a shape of the housing designed to be placed in the head for curing pipeline resin lining, which will effectively maximize its cooling through the use of a unique shape of a passage or independent passages, whose length is significantly (even several dozen times) greater than the length of the head itself, and which will have an undisturbed and homogeneous passage along its entire length, allowing a constant, laminar, undisturbed flow of cooling air through the housing.

The essence of the housing of the head for curing pipeline resin lining is characterized by the fact that it has at least one cooling passage, which is more than twice as long as the length of the longitudinal part of this housing. It is advantageous when the cross-sectional area of the cooling passage is constant along its entire length, as well as when the outlets of the cooling passages are located on the side surface of the housing ring-shaped shoulder and when the cooling passages included in the set of passages are evenly distributed with respect to the X axis of the housing. It is also beneficial if the cross-sectional area of the cooling passage (6) has a circular or rectangular profile. It is also advantageous if its front surface has a recess that increases the force/velocity of air flow entering the passages, and if it has a centrally located hole for the wires powering the head components, as well as if it is made of metal using 3D printing technology.

The use of a housing according to the invention with an innovative cooling passage/passage system with the length of a single duct many times longer than the length of the housing itself used in the heads for curing pipeline resin lining enabled a significant increase in the cooling capacity of said head, which directly increased its life and efficiency. In addition, the innovative shape of the internal passages and their mutual arrangement did not significantly affect the external dimensions of the housing itself, thanks to which, according to the invention, the housing can be used in the heads used so far.

An additional advantage of the solution according to the invention is the possibility to use an inlet funnel for compressing air at the inlet to the cooling passage(s), as well as the possibility to make the head in such a way that the passage(s) are placed on the side walls of the housing, as a result of which the air discharged from the housing will not interfere with the flow of the supplied air.

DETAILED DESCRIPTION OF THE INVENTION

Figure 1:
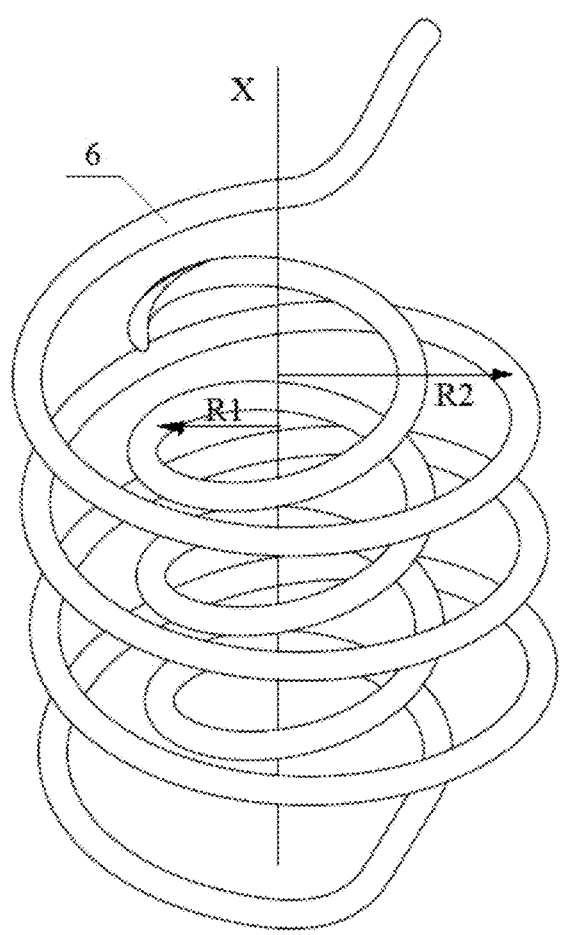
FIG. 1 shows a perspective view of a single cooling passage with a circular cross-section for use in a housing according to the first embodiment of the invention.
Figure 2:
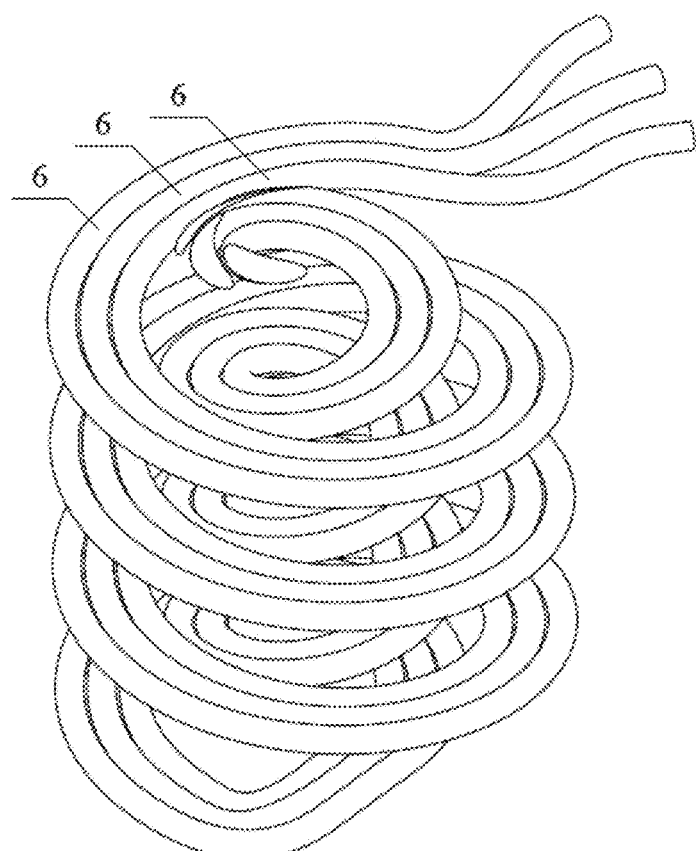
FIG. 2 shows a perspective view of a set of three cooling passages located next to each other for use in a housing according to the second embodiment.
Figure 3:
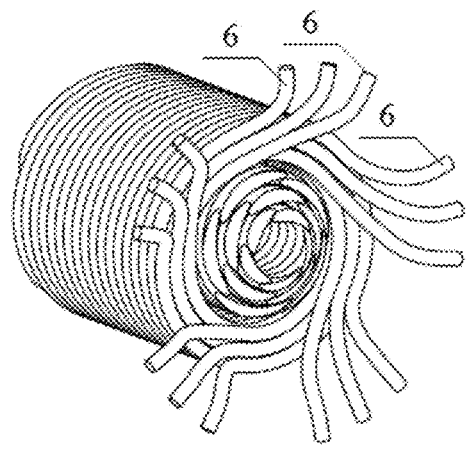
FIG. 3 shows a prospective view of a system of five sets of three cooling passages to be used in a housing according to the third embodiment from the side of their inlets/outlets.
Figure 4:
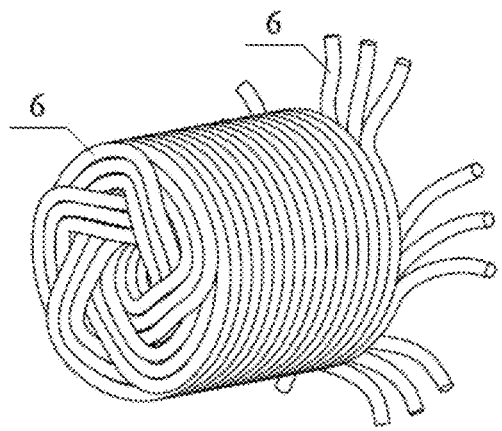
FIG. 4 shows a prospective view of the same system of passages from the side of the blind part of the housing.
Figure 5:
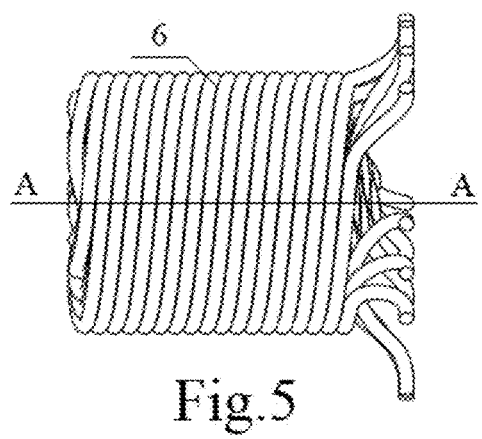
FIG. 5 shows a side view of the same system of passages.
Figure 6:
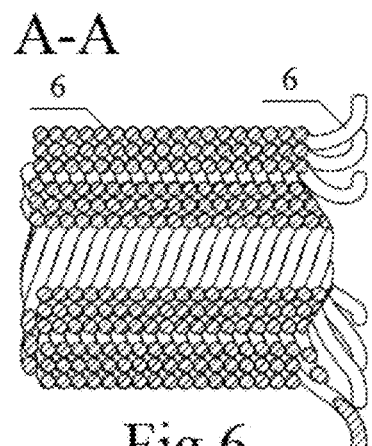
FIG. 6 shows a cross-section of the same system of passages along the line A-A.
Figure 7:
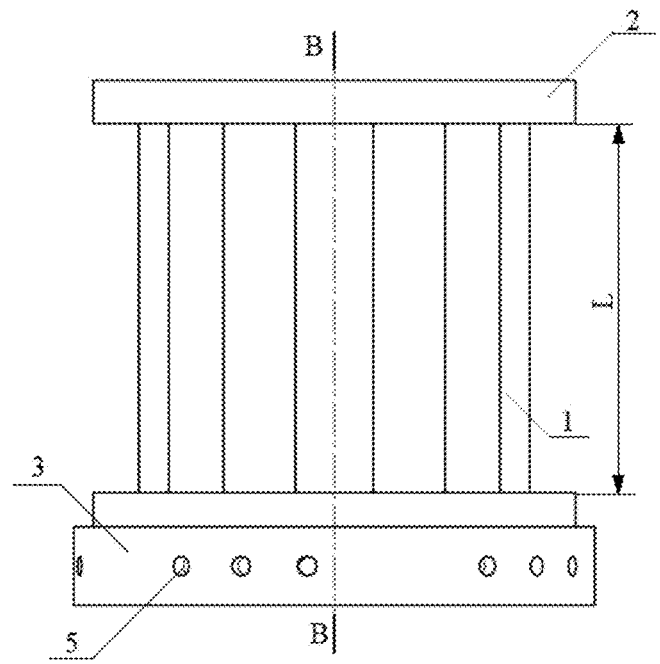
FIG. 7 shows a side view of an exemplary housing with a system of five sets of three cooling passages.
Figure 8:
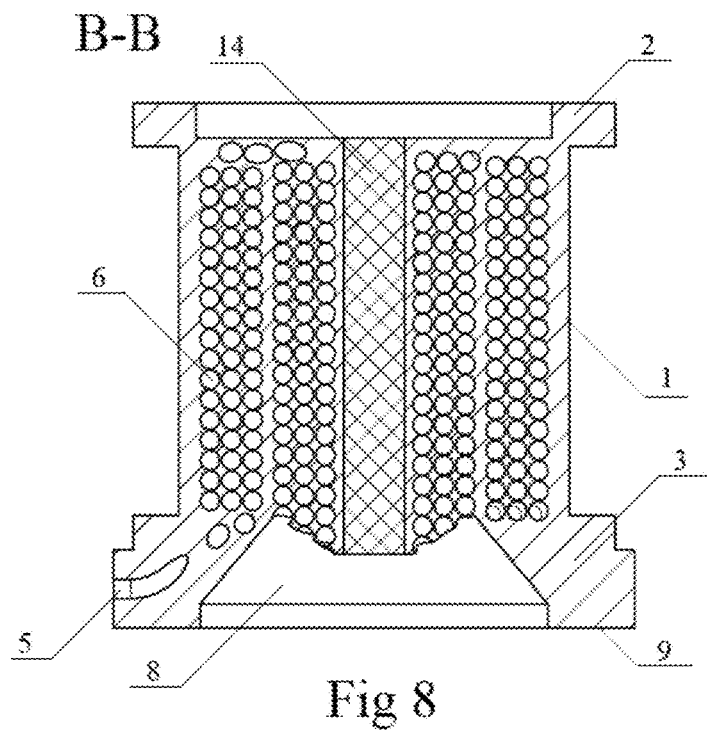
FIG. 8 shows a cross-section of the same housing along the line B-B.
Figure 9:
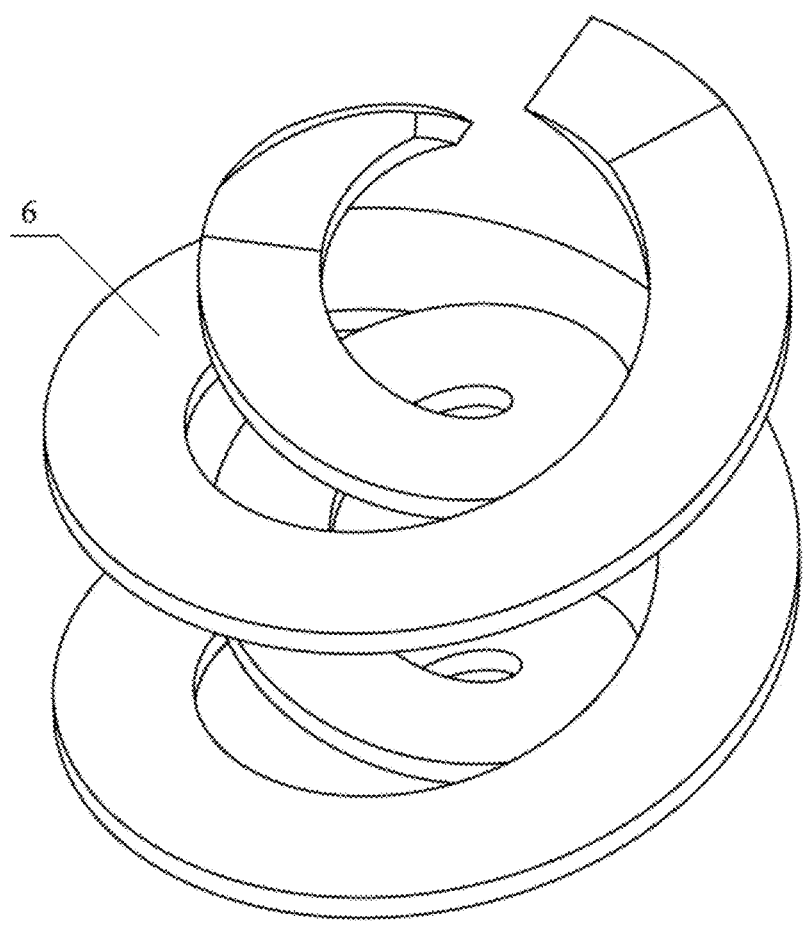
FIG. 9 shows a perspective view of a single cooling passage with a longitudinal rectangular section to be used in a housing according to the fourth embodiment.
Figure 10:
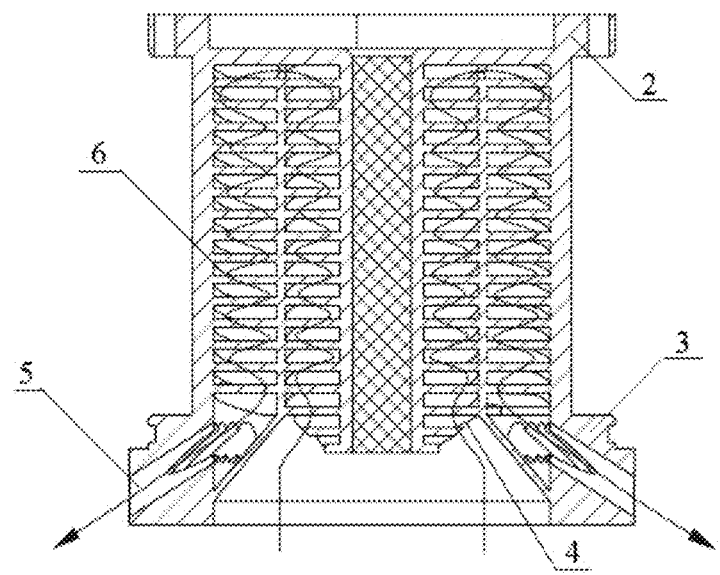
FIG. 10 shows a cross-section of an exemplary housing with a system of three sets of three cooling passages with a rectangular section along the line B-B.
Figure 11:
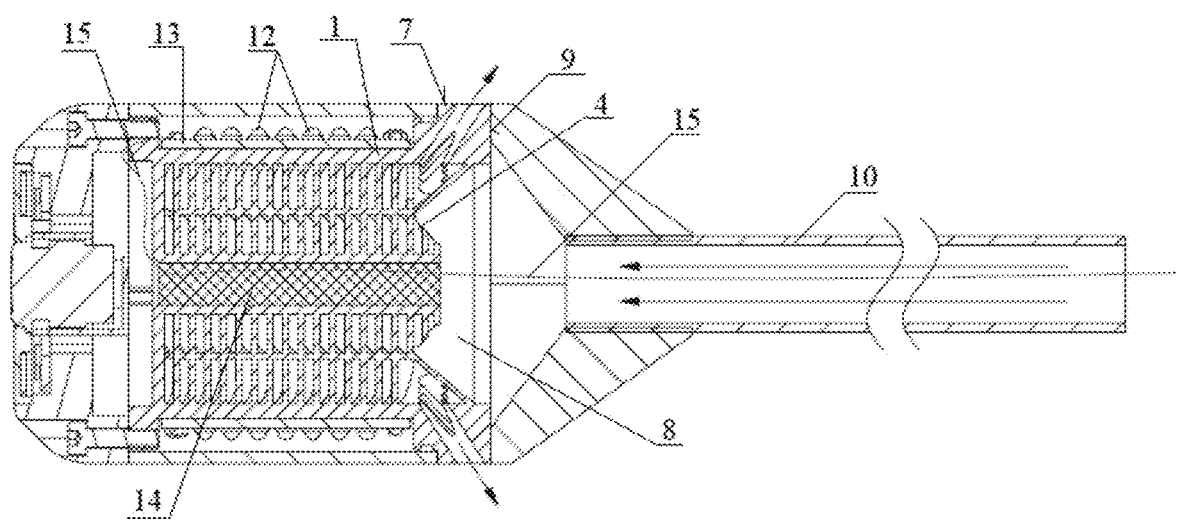
FIG. 11 shows a cross-section of an exemplary head with a housing with a system of cooling passages of rectangular section installed in it.

The object of the invention is shown in examples of the invention in FIGS. 1 to 11, where FIG. 1—shows a perspective view of a single cooling passage with a circular cross-section for use in a housing according to the first embodiment of the invention, FIG. 2—shows a perspective view of a set of three cooling passages located next to each other for use in a housing according to the second embodiment, FIG. 3—shows a prospective view of a system of five sets of three cooling passages to be used in a housing according to the third embodiment from the side of their inlets/outlets, FIG. 4—shows a prospective view of the same system of passages from the side of the blind part of the housing, FIG. 5—shows a side view of the same system of passages, FIG. 6—shows a cross-section of the same system of passages along the line A-A, FIG. 7—shows a side view of an exemplary housing with a system of five sets of three cooling passages, FIG. 8—shows a cross-section of the same housing along the line B-B, FIG. 9—shows a perspective view of a single cooling passage with a longitudinal rectangular section to be used in a housing according to the fourth embodiment, FIG. 10—shows a cross-section of an exemplary housing with a system of three sets of three cooling passages with a rectangular section along the line B-B, and FIG. 11—shows a cross-section of an exemplary head with a housing with a system of cooling passages of rectangular section installed in it.

1$^{st}$ Embodiment

A housing according to the first embodiment comprises a longitudinal part 1 with the shape of a prism with a base of a regular polygon, which at one end has said mounting ring raised face 2 and at the other end there is a ring raised face 3 with the inlet 4 and outlet 5 of the cooling passage 6 with a circular cross-sectional profile, which is situated inside the longitudinal part 1 of the housing and extends from the inlet 4, to the opposite end of the longitudinal part 1 along a spiral line with a fixed radius R1, then the radius is gradually reduced to R2=0.5 R1 and then along another spiral line with a fixed smaller radius R2, the cooling passage 6 returns to the side surface 7 of the ring raised face 3 ending with the outlet 5, where the total length S of the cooling passage 6 was six times the length L of the longitudinal part 1 of the housing.

2$^{nd}$ Embodiment

A housing according to the second embodiment has a design similar to the housing described in the first embodiment, with the difference that its ring raised face 3 had three inlets 4 and three outlets 5 for a set of three cooling passages 6, positioned in series and concentrically to each other, which extended in the housing along a spiral line as described in the first embodiment. The total length S of the set of all three cooling passages was fifteen times greater than the length L of the longitudinal part 1 of the housing.

3rd Embodiment

A housing according to the third embodiment has a design similar to the housing described in the second embodiment, with the difference that its ring raised face 3 had fifteen inlets 4 and fifteen outlets 5 for a system of five sets of three cooling passages 6, described in the embodiment, with each of these five sets of three cooling passages 6 being rotated with respect to the X axis of the housing by an angle of 72° in relation to the next one. The total length S of the system of all five sets of three cooling passages was seventy-five times greater than the length L of the longitudinal part 1 of the housing.

4th Embodiment

A housing according to the fourth embodiment has a design similar to the one described in the first embodiment with the difference that its cooling passage 6 was replaced by a cooling passage with a longitudinal rectangular section along its entire length.

5th Embodiment

A housing according to the fifth embodiment has a design similar to that of the housing described in the fourth embodiment with the difference that its ring raised face 3 had four inlets 4 and four outlets 5 for a system of four cooling passages 6, each of these four units of a cooling passage 6 was rotated with respect to the axis X of the housing by 90° in relation to the next one.

All the examples described above had passages 6 with equal, constant cross-sectional profile over their entire length. It is obvious that the passages described in examples 1-5 can be replaced by passages of any profile, including triangular, square, and oval ones.

In other embodiments not shown in the figures of a housing according to the invention, the spiral lines along which the individual passages extended had different pitch, and the radii R1 and R2 of variable length along the entire length L of the longitudinal part 1 of the housing, provided that the length S of a single cooling passage 6 is more than twice as long as the length L of the longitudinal part 1 of the housing.

In the following embodiments, sets and systems of cooling passages 6 had different numbers of passages selected depending on the needs and external dimensions of a housing, while the air inlets 4 of the passages 6 were positioned in a conical recess 8 made on the front surface 9 of a ring raised face 3 increasing the force/velocity of the air stream entering the passages 6, while the outlets 5 were positioned on the front surface 9 of the shoulder 3.

According to the invention, housings were made of metal, preferably of aluminium, with 3D printing technology.

According to the invention, a housing can be used in known and previously used heads for curing of pipeline resin lining, in which compressed air or other cooling medium is fed through a flexible pipe 10 to the front surface of the head housing 9 from where, through a recess 8 and through inlets 4, it goes through a cooling passage(s) 6 flowing undisturbed along the entire housing extending over the length L, then it returns where, through outlets 5 located on the front surface 9 or the side surface 7 of a ring raised face 3 leaves the housing, enabling it to be cooled effectively by dissipating the heat generated by a set of LEDs 12 positioned on plates 13 attached to the external walls of this housing. Depending on the needs, a housing, according to the invention, may additionally have a centrally located hole 14 for power supply wires 15 of LEDs 12 or other head components.

The invention claimed is:

1. A head housing for curing of resin pipeline lining comprising:
    a base;
    a mounting ring raised face (2) at a first end of the base;
    a ring raised face (3) at a second end of the base;
    an inlet (4) mounted on a conical recess (8) on a front surface (9) of the ring
    raised face (3);
    an outlet (5) located at the front surface (9) of the ring raised face (3);
    at least one spiral shape cooling passage (6) extending from the inlet (4) to the outlet (5), the at least one spiral cooling passage (6) having a spiral line having a first radius (R1) by the inlet (4) and a second radius (R2) by the outlet (5), wherein R2=0.5R1;
    the at least one cooling passage (6) having a length S more than twice a length L of a longitudinal part (1) of the housing.
2. The head housing as claimed in claim 1, wherein a cross-section of the at least one spiral shape cooling passage (6) is constant over its entire length.
3. The head housing as claimed in claim 1, wherein the outlet (5) of the at least one spiral shape cooling passages (6) is positioned on a side surface (7) of the ring raised face (3) of the housing.
4. The head housing as claimed in claim 1, wherein a cross-section of the at least one spiral shape cooling passage (6) has a circular shape.
5. The head housing as claimed in claim 1, wherein a cross-section of the at least one spiral shape cooling passage (6) has a rectangular shape.
6. The head housing as claimed in claim 1, wherein the cooling passages (6) are evenly distributed with respect to an X axis of the housing.
7. The head housing as claimed in claim 1, wherein the housing includes a centrally located hole (14) for power supply wires (15) of head components.
8. The head housing as claimed in claim 1, wherein the housing is made of metal with 3D printing technology.

* * * * *